United States Patent [19]

Melchionna

[11] Patent Number: 5,350,120
[45] Date of Patent: Sep. 27, 1994

[54] METHOD OF CRUSHING A BOTTLE AND A GLASS CRUSHING APPARATUS

[75] Inventor: Carmine M. Melchionna, Watertown, Conn.

[73] Assignee: New England Redemption of Connecticut, Inc., New Haven, Conn.

[21] Appl. No.: 105,334

[22] Filed: Aug. 10, 1993

[51] Int. Cl.$^5$ ............................................. B02C 19/06
[52] U.S. Cl. ............................................ 241/5; 241/99
[58] Field of Search .................. 241/5, 24, 27, 40, 99, 241/186.4, 189.1, 195, 275

[56] References Cited

U.S. PATENT DOCUMENTS

| | | | |
|---|---|---|---|
| 3,587,984 | 9/1969 | Taylor et al. | 241/99 |
| 4,205,794 | 6/1980 | Horton et al. | 241/99 X |
| 4,248,388 | 2/1981 | King | 241/99 |
| 4,285,426 | 8/1981 | Cahill | 194/4 |
| 4,316,533 | 2/1982 | Hughes et al. | 194/4 |
| 4,324,325 | 4/1982 | DeWoolfson | 194/4 |
| 4,361,290 | 11/1982 | Francis | 241/189.1 X |
| 4,492,295 | 1/1985 | DeWoolfson | 194/4 |
| 4,532,859 | 8/1985 | Solordal | 100/35 |
| 4,573,641 | 3/1986 | DeWoolfson et al. | 241/36 |
| 4,579,216 | 4/1986 | DeWoolfson et al. | 194/212 |
| 4,653,627 | 3/1987 | Hampson et al. | 194/209 |
| 4,871,118 | 10/1989 | Maloney | 241/99 |
| 4,919,534 | 4/1990 | Reed | 356/73 |
| 4,982,904 | 1/1991 | Greiner | 241/189.1 X |
| 5,111,927 | 5/1992 | Schulze, Jr. | 194/209 |
| 5,215,265 | 6/1993 | Lodovico | 241/99 |

FOREIGN PATENT DOCUMENTS

| | | | |
|---|---|---|---|
| 2677560 | 12/1992 | France | 241/99 |
| 1473838 | 4/1989 | U.S.S.R. | 241/99 |

Primary Examiner—Timothy V. Eley
Attorney, Agent, or Firm—Kramer, Brufsky & Cifelli

[57] ABSTRACT

An improved glass crushing apparatus for a reverse bottle vending, crushing and sorting machine having an opentop, rotatable receptacle mounted at the top of the bin for catching the bottle to be smashed in the bin. After receipt of the bottle, the receptacle is rotated by a stepping motor controlled by the microprocessor and the bottle is dropped onto and smashed by a rotating impeller which contacts and throws the bottle against a reinforced, sharp corner of the bin. The crushed glass or glass cullet is then collected in a predesignated collection bin.

9 Claims, 3 Drawing Sheets

METHOD OF CRUSHING A BOTTLE AND A GLASS CRUSHING APPARATUS

BACKGROUND OF THE INVENTION

Field of the Invention

This invention relates to apparatus for crushing glass bottles as a first step for subsequent recycling of the crushed glass in the formation of new bottles.

Description of the Prior Art

With increasing emphasis in recent years on energy conservation and environmental preservation, the collection and recycling of empty glass bottles has become an important factor in the conservation and preservation effort. The recycling of glass bottles has helped to reduce the presence of broken glass bottles strewn throughout the environment and lessen energy consumption by recycling empty glass bottles for future use. Numerous states and localities have adopted glass conservation programs that require the recycling of glass bottles.

In my copending patent application, Ser. No. 43,443, filed Apr. 6, 1993 entitled Reverse Bottle Vending, Crushing And Sorting Machine, assigned to the same assignee as the present application, a machine is disclosed for refunding glass bottle deposits, crushing the bottle and sorting the crushed glass as to color, either clear, brown or green. The bottle has a label provided with an optically read bar code which identifies the bottle's 1) color, 2) whether it must be returned to the manufacturer in one piece, and 3) whether a refund is, in fact, due for the particular bottle. The bottle is inserted in the apparatus and the bar code on the bottle passes beneath an optical scanner. If the bottle is refundable and of a particular color (i.e., clear, green, brown), a microprocessor electrically connected to the scanner activates a door and a deflector causes the bottle to fall into a glass crusher (a bin provided with a rotating plate which smashes the bottle). Upon opening of the door, a platform in the crusher bin would catch the bottle to be crushed and upon reclosing of the door, the bottle would be dropped into the bin onto the rotating smasher plate. A trap door beneath the glass crusher is positioned by the microprocessor so that the crushed glass is conveyed to one of three collection bins depending on the sensed color. If the bottle is not to be crushed, the microprocessor causes another door to open (opposite to the crusher entrance) and the bottle is collected in one piece in another bin. In either event, a chit is printed and released by the apparatus for each bottle inserted in the machine. If the bottle does not warrant a refund, it is returned to the depositor.

The use of a door which had to be opened exposing the crushing bin and the consequent catching and release of the bottle to be smashed is cumbersome, and incorporates additional unnecessary steps in the crushing process.

SUMMARY OF THE INVENTION

Accordingly, this invention relates to an improved glass crushing apparatus for a reverse bottle vending, crushing and sorting machine of the type disclosed in U.S. Ser. No. 43,443 having an open-top, rotatable receptacle mounted at the top of the bin for catching the bottle to be smashed in the bin. After receipt of the bottle, the receptacle is rotated by a stepping motor controlled by the microprocessor and the bottle is dropped onto and is smashed by a rotating impeller which contacts and throws the bottle against a reinforced, sharp corner of the bin. The crushed glass or glass cullet is then collected in a predesignated collection bin.

BRIEF DESCRIPTION OF THE DRAWINGS

Further objects and advantages of the invention will become more apparent from the following description and claims and from the accompanying drawings, wherein:

DETAILED DESCRIPTION OF THE PREFERRED EMBODIMENT

Figure 1:
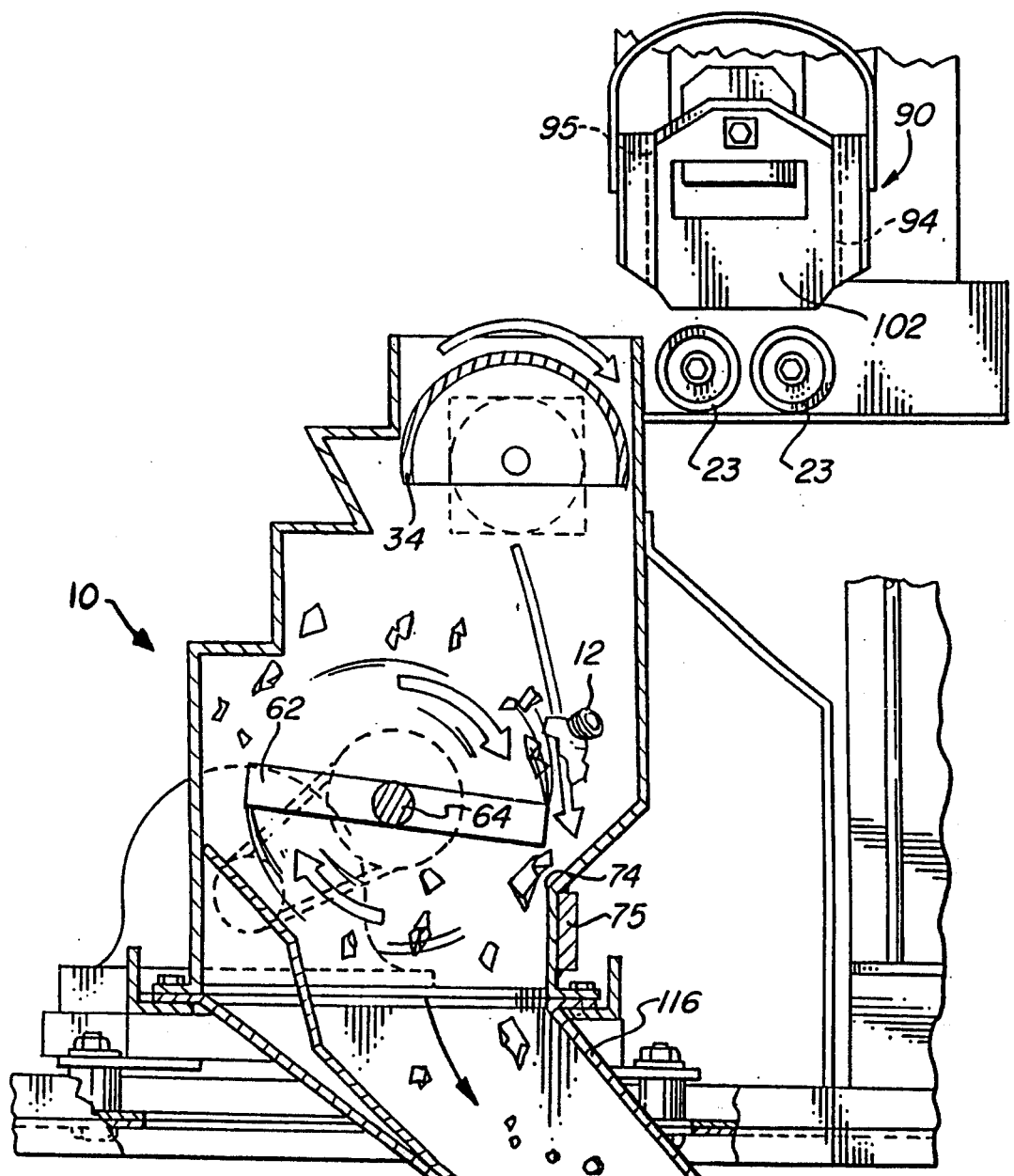
FIG. 1 is a longitudinal cross-sectional view illustrating the bottle crushing apparatus of the present invention.

Referring now to the drawings in detail wherein like numerals indicate like elements throughout the several views, the bottle crushing apparatus 10 of the present invention is employed in a reverse bottle vending, crushing and sorting machine of the type illustrated in my copending patent application, Ser. No. 43,443, filed Apr. 6, 1993, which disclosure is incorporated by reference in its entirety herein.

In general, the disclosure of Ser. No. 43,443 relates to an apparatus for collecting and storing refundable empty glass bottles of diverse colors and for issuing predetermined return deposits for the bottles collected, each refundable bottle having code imprinted thereon to identify the brand and color of the bottle. Preselection means determine the brand, color and refundability of an empty glass bottle, the preselection means including a laser scanner for reading the imprinted code on each bottle, a bottle access area configured to accommodate the bottles for exposure to the laser scanner and a microprocessor capable of receiving and interpreting the read code from the laser scanner.

The microprocessor receives the signal containing the read code from the laser scanner and compares the read code with a list of codes contained within its programmable memory. The programmed codes provide information, such as refunds, price, and bottle color, about the acceptable, refundable glass bottles. If the read code matches a code on the programmed list, then the microprocessor transmits a signal to the accepting means to indicate that the bottle placed within a bottle access area is to be received into the machine. However, if the read code fails to correspond with a code on the programmed list in the microprocessor programmable memory area, the microprocessor transmits a signal to indicate that the bottle is unacceptable for refunding purposes and, accordingly, the bottle should be removed from the bottle access area. Alternatively, the bottle may be of the type for which a refund is due, but, must be returned to the manufacturer in one piece. It may thus be on the list in the microprocessor, but must still be removed from area and collected in a separate bin and not crushed. The signal generated by the microprocessor in either of these events can be used to activate a reversible motor connected to the rear of a harness surrounding the bottle at the bottle access area, to rotate the harness to contact the bottle with a side of harness to sweep the bottle into a "whole" bottle collection bin.

Alternatively, if the bottle is non-refundable, it is returned to the customer.

When the microprocessor has determined that a particular bottle placed within the bottle access area is to be accepted for further processing and need not be returned to the manufacturer in one piece, the brand or type of the accepted bottle is stored in the memory area of the microprocessor. This storage of the bottle brand or type information in the microprocessor, allows a particular retailer to know the distribution and classification of the various bottles for which he has provided a refund.

The machine accepts for further processing only those bottles identified by the preselection means as being refundable, and which need not be returned in one piece to the manufacturer. As herein embodied, the reverse vending machine includes two rotatable sleeves 23 which supports the bottle 12 in the bottle access area. The customer or retailer places the empty glass bottle 12 on the sleeves 23, through an opening into the machine, and the bottle is rotated wherein the laser scanner reads the imprinted code on the bottle 12. A harness 90 including an end wall 102 provides an enclosure for the bottles 12 placed within the bottle access area.

The refundable bottles are readily sorted after they are crushed into three colors, i.e. clear, brown, or green. This is accomplished by selectively positioning a rotatable chute 114 at the end of a glass crushing bin 116, the chute to direct glass cullet smashed by the crushing means to one of a plurality of collection receptacles (not shown), depending on the color of the glass cullet. The direction and amount of rotation of chute 114 is responsive directly to a signal received by the microprocessor.

Figure 2:
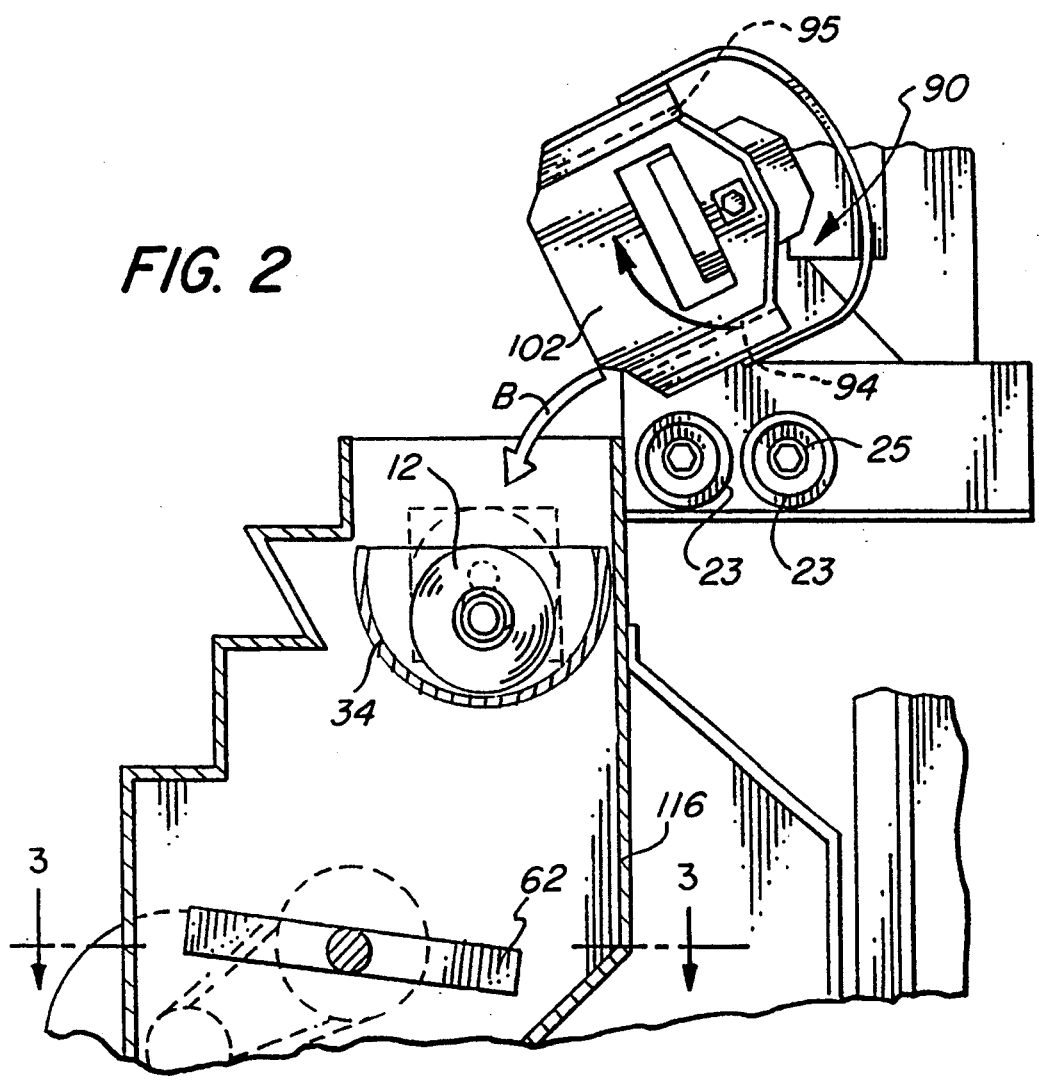
FIG. 2 is a view similar to FIG. 1 with a bottle inserted in the apparatus being accepted and transported to the crushing means.
Figure 3:
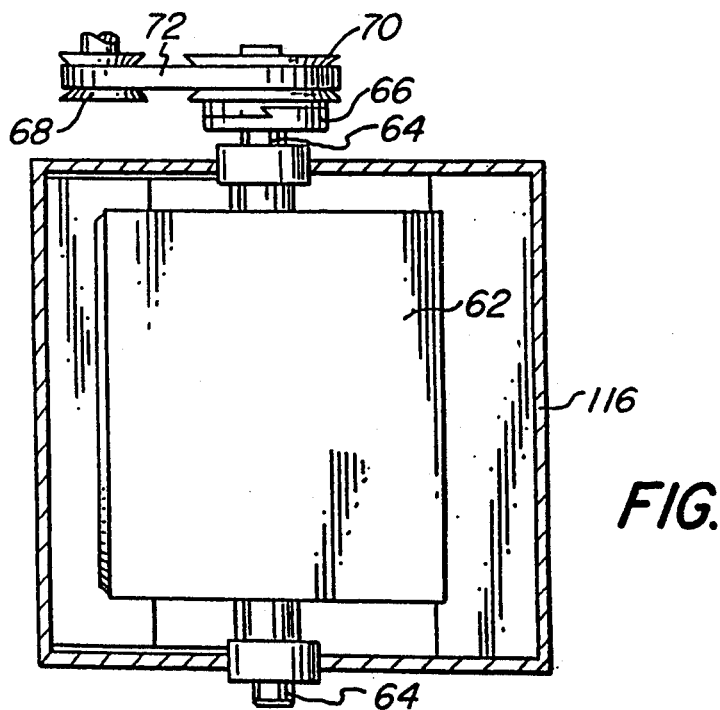
FIG. 3 is a cross-sectional view taken substantially along the plane indicated by line 3—3 of FIG. 2 and illustrates the crushing means of the present invention.
Figure 4:
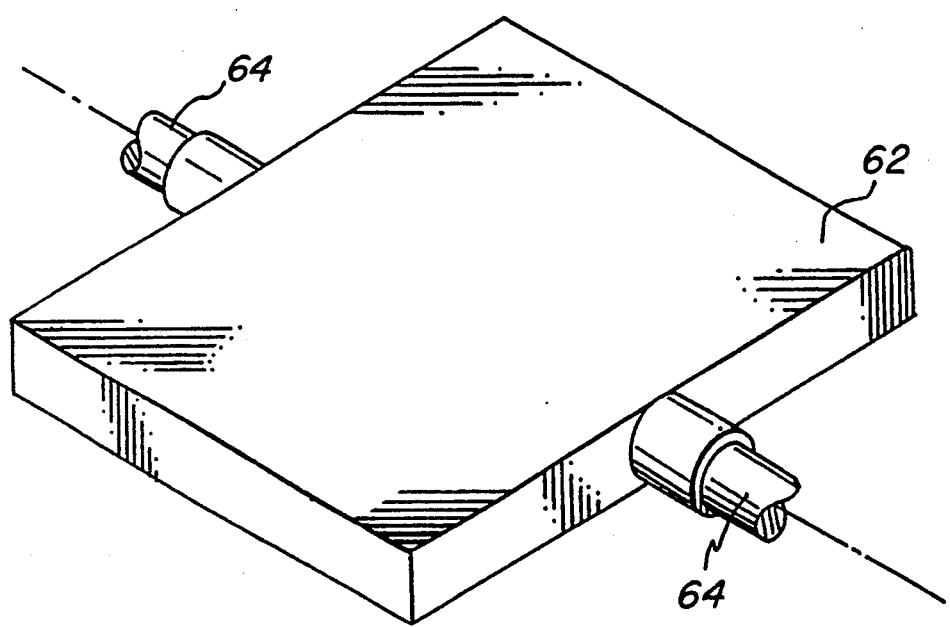
FIG. 4 is a perspective view of the crushing bar of FIG. 3.

Prior to receipt by one of the collection receptacles, the accepted bottle 12 is crushed into glass cullet. With specific reference to FIGS. 1 and 2, a reversible stepping motor receives a signal from the microprocessor to rotate the harness 90 in a clockwise direction as viewed in FIGS. 1 and 2, to cause sidewall 94 of harness 90 to contact and move bottle 12 in the direction of arrow B (see FIG. 2). The bottle 12 is pushed by the harness 90 into an open-top, rotatable receptacle 34 mounted at the top of the bin 116 for catching the bottle 12 to be smashed in the bin. After receipt of the bottle, the receptacle is rotated by a stepping motor (not shown) controlled by the microprocessor and the bottle is dropped from the receptacle and smashed by a rotating impeller 62 which contacts and throws the bottle against a reinforced, sharp corner 74 of the bin 116. An anvil support 75 is attached to the exterior surface of bin 116 to reinforce it adjacent corner 74. The crushed glass or glass cullet is then collected in a predesignated collection bin from chute 114.

The crushing plate 62 is rotatably mounted by shaft 64, to the sidewalls of bin 116. One end of shaft 64 is connected by a clutch 66, pulleys 68, 70 and belt 72 to a motor (not shown), which when activated will rotate shaft 64 and plate 62. Plate 62 crushes and smashes the bottle 12 by throwing it against sharp corner 74.

It will be apparent to those skilled in the art that various other modifications and variations could be made in the structure of the invention without parting from the scope and content of the invention.

What is claimed is:

1. A method for crushing glass bottles comprising the steps of:
    conveying a glass bottle to a crushing bin,
    catching the bottle at the top of the bin,
    dropping the whole bottle into the bin,
    impelling the whole bottle against an interior angular wall of the bin forming a sharp corner having an apex to smash the same, and
    collecting the smashed glass in a collection bin.

2. The method of claim 1 including the additional step of sorting the smashed glass as to color prior to collecting the same.

3. The method of claim 1 including the additional step of reinforcing said bin walls adjacent said sharp corner defining the site of impact of the glass bottle.

4. A method for crushing glass bottles comprising the steps of:
    dropping a whole bottle into a crushing bin,
    impelling the whole bottle against an interior angular wall of the bin forming a sharp corner having an apex to smash the same, and
    collecting the smashed glass in a collection bin.

5. The method of claim 4 including the additional step of reinforcing said bin walls adjacent said sharp corner defining the site of impact of the glass bottle.

6. Glass crushing apparatus comprising:
    a confined space having surrounding side walls, a portion of one of said side walls being bent to provide a sharp interior corner having an apex within said confined space,
    a rotatable receptacle for receiving a bottle to be crushed in said confined space,
    a plate rotatably mounted in the confined space below said bottle receptacle adjacent said sharp interior corner for receiving a bottle upon rotation of said receptacle and throwing it against said sharp interior corner formed from said surrounding side walls of said confined space to contact and smash the bottle, and
    drive means for continuously rotating said plate.

7. The apparatus of claim 6 wherein the said sharp interior corner is formed from an angular confluence of the side walls of said confined space.

8. The apparatus of claim 7 wherein the exterior of said side walls includes a reinforcement support surface adjacent said sharp corner.

9. The apparatus of claim 6 wherein said receptacle is rotatable in 180° stepped increments.

* * * * *